UNITED STATES PATENT OFFICE.

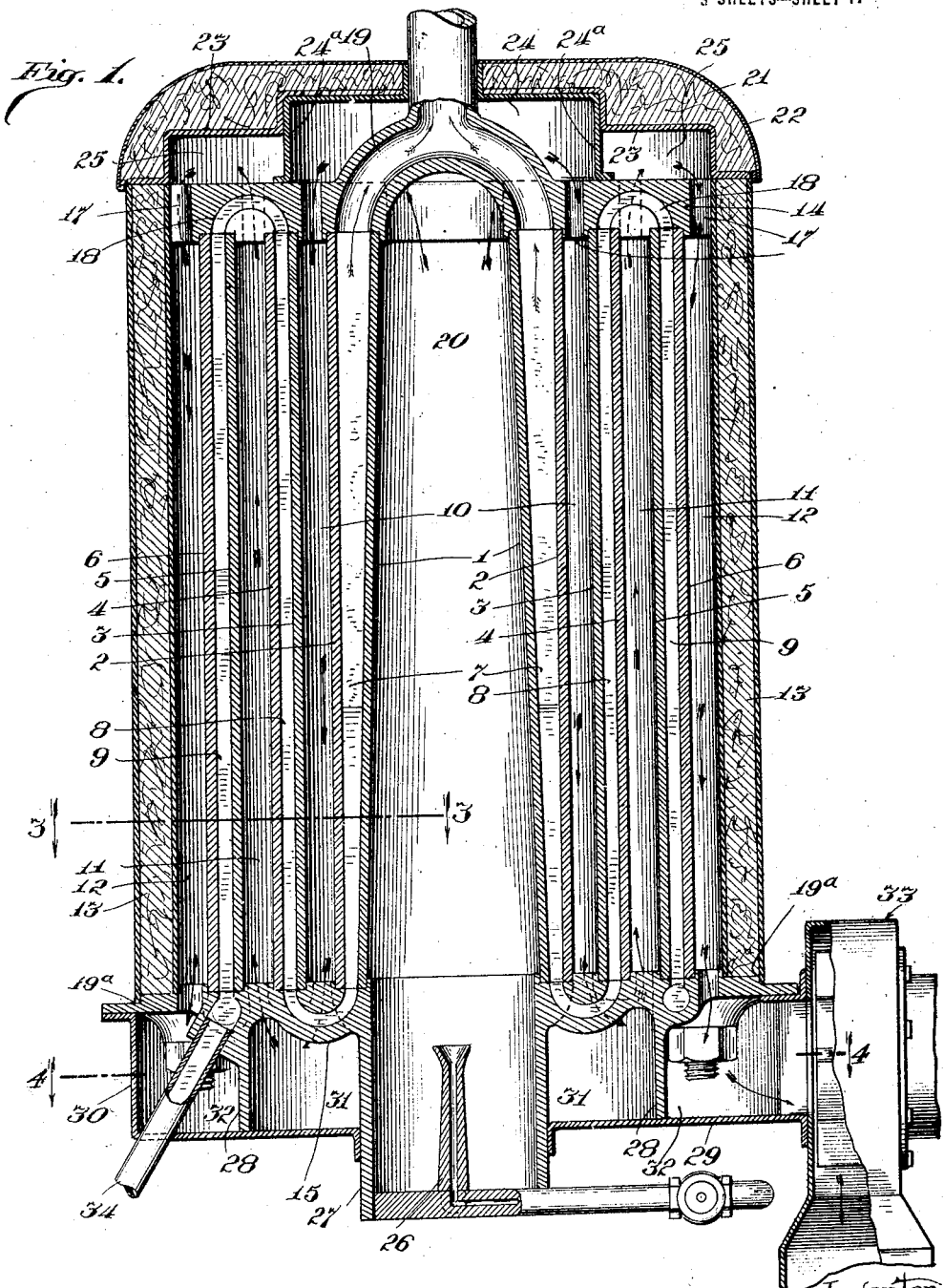

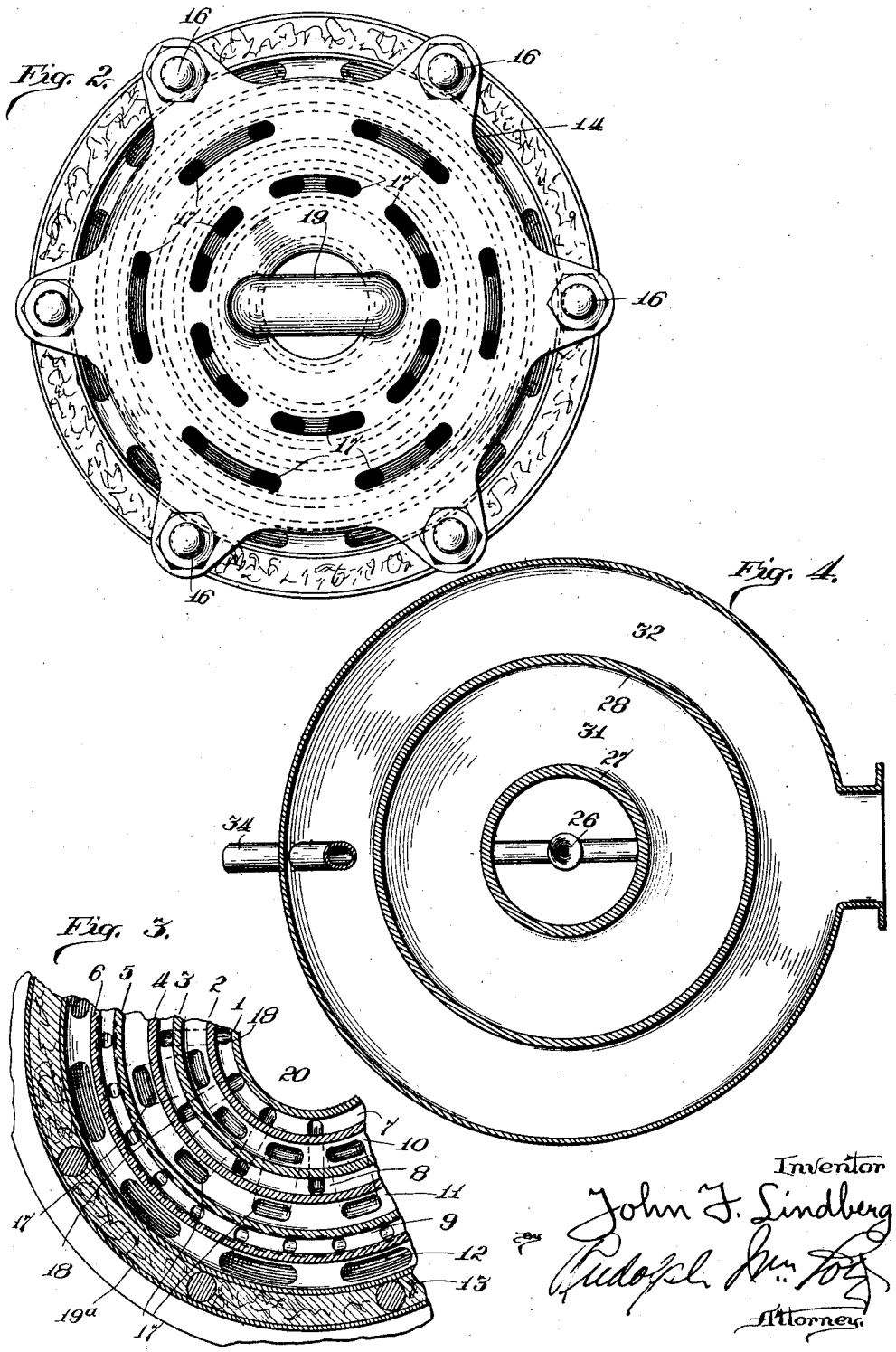

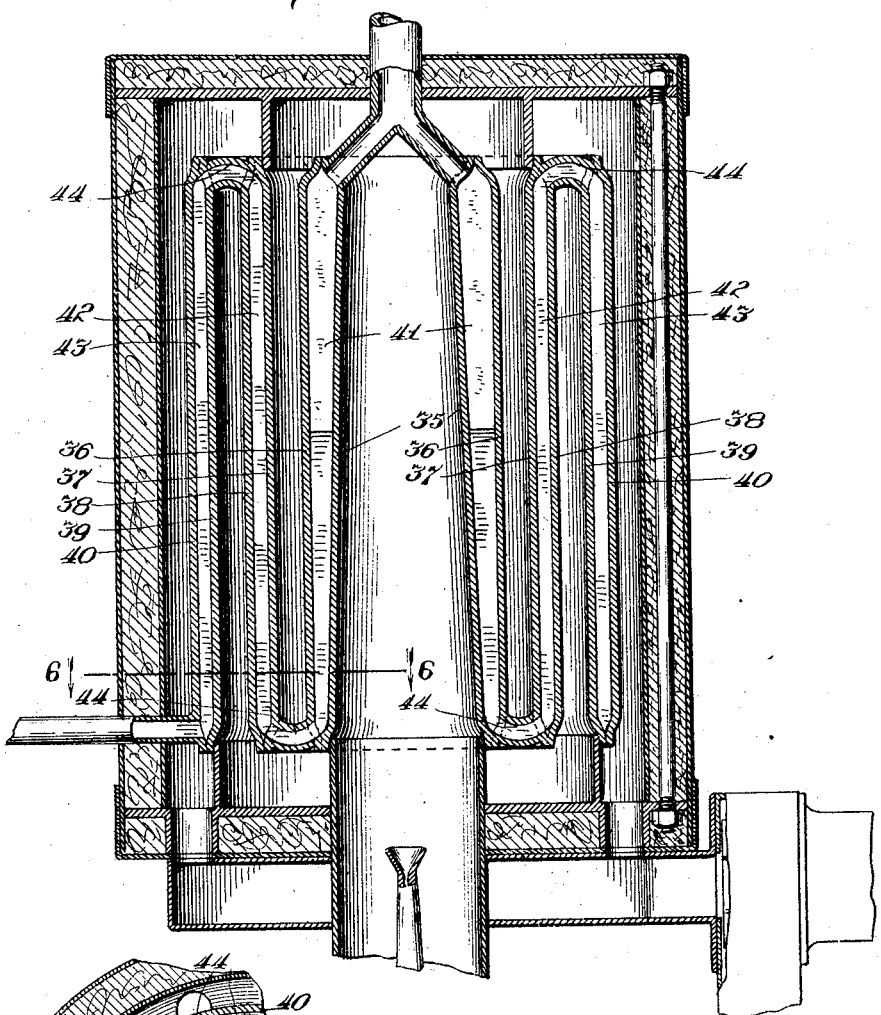
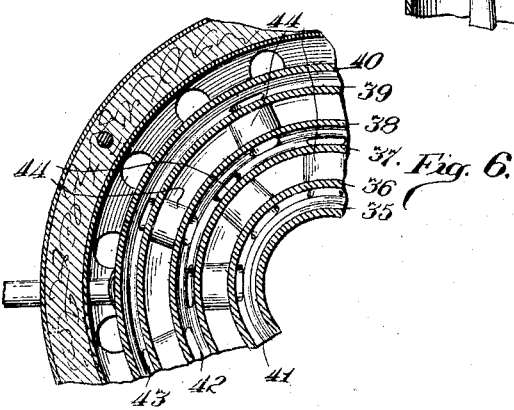

JOHN F. LINDBERG, OF CHICAGO, ILLINOIS.

STEAM GENERATOR.

1,406,044.

Specification of Letters Patent.

Patented Feb. 7, 1922.

Application filed November 22, 1919. Serial No. 339,972.

*To all whom it may concern:*

Be it known that I, JOHN F. LINDBERG, a citizen of the United States, residing at Chicago, in the county of Cook and State of Illinois, have invented certain new and useful Improvements in Steam Generators; and I do hereby declare the following to be a full, clear, and exact description of the invention, such as will enable others skilled in the art to which it appertains to make and use the same.

This invention has for its object to provide an improved steam generator or water heater, and has for its object to provide a simple and efficient device of this character which will present a very large heating surface in proportion to the volume of water space therein and wherein the hot products of combustion will be caused to pass successively in contact with the heating surfaces in a general direction opposite to that in which the water or steam generated passes until substantially all heat has been absorbed from the hot products of combustion.

The invention is intended and adapted particularly for so-called instantaneous water heaters and for that type of small steam generators which are particularly adapted for motor propelled vehicles and similar high pressure installations wherein economy of weight and space in proportion to power generated constitutes an important factor.

Suitable embodiments of the invention are illustrated in the accompanying drawings, in which:

Fig. 1 is a central longitudinal section of a water heater constructed in accordance with the invention.

Fig. 2 is a top plan view of the same with the outer casing removed.

Fig. 3 is a fragmentary detail plan section on the line 3—3 of Fig. 1.

Fig. 4 is a bottom plan view of the same.

Fig. 5 is a view similar to Fig. 1, illustrating the device embodied in a high pressure steam generator.

Fig. 6 is a fragmentary top plan view of the same.

The said water heater and steam generator comprises a plurality of pairs of concentric tubes of different diameters as, for example, the pairs of tubes 1 and 2, 3 and 4, and 5 and 6. Between each pair of said tubes there is provided an annular space 7, 8 and 9 respectively, through which water is adapted to pass successively in reverse of the order mentioned. The innermost or extreme inner tube 1 is preferably slightly tapering so as to be of less diameter at its upper than at its lower end, whereby the inner extreme annular space 7 is enlarged at its upper end portion for reasons which will be hereinafter more fully pointed out.

The tube 3 is of considerably larger diameter than the tube 2 so that between the same there is provided an annular space 10, constituting a flue for hot products of combustion. A similar flue 11 is provided between the tubes 4 and 5 and another flue, 12, is provided externally of the tube 6 and inwardly of the circumferential wall 13 of the boiler casing.

All of said tubes are preferably made of equal length and at their ends are fitted into annular grooves in the boiler heads 14 and 15 preferably comprising relatively heavy castings held in relative position upon the ends of the several tubes 1 to 6 inclusive by means of the tension bolts 16 in a well-known manner. The said boiler heads 14 and 15 are, as shown in Figs. 2 and 3, provided at regular intervals with arcuate slots 17, registering with the several flues 10, 11 and 12 for permitting hot products of combustion to enter and leave said flues.

Alternated with the said arcuate slots 17 in the said heads 14 and 15 are arcuate passages 18 connecting adjacent annular water spaces 7, 8 and 9 with each other. The arrangement of said arcuate slots 17 and arcuate passages 18 in the respective heads 14 and 15 is such as to permit water entering the lower end of the extreme outer annular chamber 9 to flow upwardly through the same, thence over into the upper end of the annular chamber 8 and thence into the bottom of and upwardly through the inner extreme annular chamber 7 from which it is exhausted through the inverted Y-shaped outlet passage 19 in the head 14. Similarly, the arcuate slots 17 in the heads 14 and 15 are relatively arranged so that hot products of combustion may pass from the top of the center flue 20, formed within the tube 1, to pass into the top of and downwardly through the flue 10, thence into the bottom of and upwardly through the flue 11 and thereafter downwardly through the flue 12 to a suitable exhaust.

The boiler casing 13 consists preferably of two concentric tubes of different diameters provided with an annular space therebetween which is filled with asbestos or a similar fire-proof non-heat-conducting material. Said circumferential wall thus formed rests upon the outwardly extending annular flange 19ª of the head 15 and at its upper end carries the crown portion 21 of the casing, which is preferably formed of a dished sheet metal plate 22 and a companion plate or head 23, presenting inverted terraced or stepped formations concentric with each other. The central portion of said plate or head 23 provides a substantially cylindrical flue 24 into and through which the Y-shaped outlet passage 19 projects and through which the hot products of combustion are adapted to pass from the flue 20 into the flue 10. An annular wall 24ª separates the said central flue from the concentric outer flue 25 through which the hot products of combustion are adapted to pass from the flue 11 into the flue 12. The hollow space between the head 23 and the companion head 22 is also preferably filled with fire-proof non-heat-conducting material.

The said steam generator or water heater is preferably heated by means of gaseous fuel suitably introduced through the nozzle or burner 26, projecting into the lower end of the flue 20 or an extension thereof, consisting in the instance illustrated of a central annular flange 27 of the head 15. The latter is provided with a flange 28 projecting downwardly therefrom at a point between the arcuate slots 17 communicating with the lower end of the flues 11 and 12 and which is concentric with the flange 27 so that hot products of combustion may pass from the lower end of the flue 10 into the lower end of the flue 11 but not into said flue 12. A bottom plate 29 is provided which abuts against the lower end of the flange 28 and itself is provided with an annular edge flange 30 adapted to be bolted at its upper end to the outer flange 19ª of the head 15 in any well-known manner, whereby two annular concentric flues 31 and 32 are provided below the head 15. The flue 32 communicates with the suction end of a blower or exhaust fan 33 shown in Fig. 1, whereby a constant draft or vacuum is maintained in the outlet end of the series of flues and constant circulation of hot products of combustion through the latter is maintained.

Water to be heated or converted into steam is introduced into the lower end of the annular water space 9 through the pipe 34 connecting with a suitable source of supply and projecting through the annular flue 32.

The construction illustrated in Figs. 1 to 4 inclusive is well adapted for water heating installations where the normal water pressure only is maintained and where it is not desired to generate steam under pressure. Leak-proof joints may readily be formed between the ends of the several tubes and the heads 14 and 15 in any suitable manner, and the volume of the water spaces 7, 8, and 9 may be regulated as desired in comparison with the sizes of the flues 10, 11 and 12 to heat the water circulating through the spaces 7, 8 and 9 with any desired degree of rapidity to the desired maximum temperature.

Heaters of the type commonly called instantaneous are usually equipped with suitable means for regulating the valve controlling the supply of gaseous fuel to regulate the maximum temperature to which the water may be heated, and any suitable means of this nature may be used in connection with my heater without departing from the invention.

Where the device is intended for rapid high pressure steam generation, it is preferably constructed as shown in Figs. 5 and 6, wherein the pairs of tubes 35 and 36, 37 and 38, and 39 and 40 are respectively expanded and contracted at their ends to cause them to meet as shown and they are then welded together. Adjacent annular water chambers 41, 42 and 43 thus formed are connected together by means of short arcuate tubes 44, communicating with the upper ends of opposed faces of the tubes 38 and 39 and the lower ends of tubes 37 and 36, and are welded at their ends to said tubes so as to provide joints which will withstand excessive high pressure. The openings between contiguous tubes 44 will constitute the equivalents of the arcuate slots 17 of the heads 14 and 15 to permit circulation of hot products of combustion through the flues.

In all other respects the construction and relative arrangement of parts of the boiler is substantially identical with that shown in Figs. 1 to 4 inclusive, so that further detailed description is superfluous.

Obviously, the number of pairs of concentric tubes or annular water chambers and the number of annular flues alternating therewith may be changed and varied as desired without departing from the invention as defined in the appended claims. It will also be apparent that while the exhaust fan 33 is preferable, any other suitable means for creating and maintaining a relatively constant draft at the discharge end of the outermost annular flues may be substituted for said exhaust fan, the invention comprehending any means suitable for creating and maintaining such draft.

The particular purpose of enlarging the upper end portion of the annular water space 7 or its equivalent space 41 is, in the case of the steam generator, to provide an enlarged steam chamber and also to draw the wall of the steam chamber into the direct path of the hot products of combustion so as to substantially super-heat the steam before it leaves the boiler.

It will be understood, of course, that the accompanying drawings show only the preferred embodiment of the invention and that such embodiment may be changed and varied in details of construction as above indicated and otherwise without departing from the invention as defined in the appended claim.

I claim as my invention:

A water heater comprising a plurality of concentric water chambers separated from each other by annular spaces constituting flues, said water chambers vertically disposed and connected together to cause water to flow sinuously successively therethrough, connection between one of the extreme chambers with a source of water and between the other extreme chamber and a discharge, the last-named chamber being of larger cross-sectional area at its discharge end portion than at its inlet end portion, a source of heat and an exhaust for hot products of combustion located respectively proximately to the discharge and the connection with the source of water, and means associated with said water chambers for effecting flow of hot gases from the source of heat successively through said flues to the exhaust and in a general direction opposite to the general direction of flow of the water.

JOHN F. LINDBERG.